3,010,825
PRODUCTION OF NEUTRON SOURCE MATERIAL

Gaetan G. J. Michaud and Richard R. Boucher, Deep River, Ontario, Canada, assignors to Atomic Energy of Canada Limited, Ottawa, Ontario, Canada, a company of Canada
No Drawing. Filed Nov. 9, 1959, Ser. No. 851,552
5 Claims. (Cl. 75—206)

This invention relates to the production of neutron source material.

The object of the invention is to provide a direct method of treating plutonium dioxide with beryllium metal powder to produce a sintered product having high neutron output efficiency.

Plutonium-beryllium alloys, as neutron source materials have been produced by reducing plutonium fluoride with beryllium and by heating the two metals together.

Radium-beryllium and polonium-beryllium sources have a high neutron output per unit weight, but also have certain disadvantages, notably the high $\gamma$ field associated with radium-beryllium and the relatively short life of polonium-beryllium due to the 138-day half life of $Po^{210}$.

In accordance with the present method substantially pure plutonium dioxide and beryllium metal powder, each having a particle size of minus 200 mesh (Tyler) are uniformly mixed together. The loose mixture is degassed under vacuum at a temperature of about 400° C. and sintered under vacuum at a temperature not substantially exceeding 1450° C. depending upon the beryllium concentration in the mixture. The choice of temperature used is governed by two considerations namely, the production of non-friable, dust free, sintered agglomerates strong enough to prevent breakage in normal handling and the prevention of partial liquation of the alloy.

The reactions taking place are represented as follows, depending upon the amount of beryllium present in the mixture,

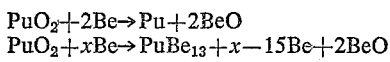

$$PuO_2 + 2Be \rightarrow Pu + 2BeO$$
$$PuO_2 + xBe \rightarrow PuBe_{13} + x - 15Be + 2BeO$$

With Be/Pu ratios of substantially 15:1 in the mixture, providing a high concentration of BeO in the end products, a sintering temperature of 1400 to 1450° C. is required to insure a satisfactory sinter. On the other hand, with Be/Pu ratios of 30:1 and higher in the mixture, providing highly metallic end products, the required sinter is produced by heating at 1250° C. With the high Be/Pu ratios the mixture may not be sintered at 1450° C. without causing partial liquation of the alloy which results in a susbtantial decrease in neutron output of the product.

Thorough mixing of the particles of plutonium dioxide and beryllium is important to insure uniform dispersal of the plutonium in the product and thus achieve the closest approach to the theoretical neutron yield after sintering. It was found that a particle size not finer than minus 200 mesh avoids excessive loss through dusting during the sizing operation and requires less time in processing.

Before sintering, the mixture may be subjected to a pressure of 20,000 p.s.i. to provide dust free pellets which withstand normal handling without breaking and chipping. The pellets may be heated in a continuous operation, thus eliminating the separate degassing step necessary with the loose mixture. The compact masses may be sintered in an argon atmosphere or in vacuum.

The neutron source material so prepared is particularly useful for the calibration of neutron-counting instruments.

The following examples are illustrative of the operation of the method.

(1) Vacuum sintering, reagents not pressed
    Be/Pu ratio 20:1

1.140 g. of minus 200 mesh $PuO_2$ and 0.840 g. of minus 200 mesh Be metal powder were thoroughly mixed in a stoppered bottle, then placed in a 9/16 inch I.D. recrystallized alumina crucible. The charge was degassed in vacuum by heating slowly in a tungsten element furnace to 400° C. in two hours and holding at that temperature for 30 minutes. The furnace was cooled to introduce a cylindrical tantalum weight (about 30 gm.) on a ½ inch diameter alumina disc on top of the charge. Sintering was carried out in vacuum by increasing the temperature in 35 minutes to 1450° C. and holding at temperature for 10 minutes. The neutron output of this source after sintering was $1.09 \times 10^5$ n/sec., 98% of the theoretical neutron yield, or $1.09 \times 10^5$ n/sec./g. Pu.

(2) Vacuum sintering, reagents pressed
    Be/Pu ratio 100:1

0.284 g. of minus 200 mesh $PuO_2$ and 0.995 g. of minus 200 mesh Be metal powder were thoroughly mixed in a stoppered bottle. The mixture was then pressed at 20,000 p.s.i. to produce a dust free, cohesive pellet. Sintering was carried out by heating in vacuum to 1250° C. in 35 minutes and holding at temperature for 10 minutes. The neutron output of the sample after sintering was $3.45 \times 10^4$ n/sec., 96.6% of the theoretical neutron yield, or $1.38 \times 10^5$ n/sec./g. Pu.

(3) Argon atmosphere sintering, reagents pressed
    Be/Pu ratio 220:1

0.286 g. of minus 200 mesh $PuO_2$ and 2.150 g. of minus 200 mesh Be metal powder were thoroughly mixed in a stoppered bottle. The powder mixture was then pressed at 20,000 p.s.i. and the resultant pellet was placed in the furnace. After flushing the system with argon, sintering was carried out by increasing the temperature to 1250° C. in 35 minutes and holding at temperature for 10 minutes. The neutron output of the sintered source was $3.62 \times 10^4$ n/sec., 97% of the theoretical neutron yield, or $1.45 \times 10^5$ n/sec./g. Pu.

(4) Argon sintering atmosphere, reagents not pressed
    Be/Pu ratio 16:1

1.143 g. of minus 200 mesh $PuO_2$ and 0.626 g. of minus 200 mesh Be metal powder were thoroughly mixed in a stoppered bottle. The mixture was then transferred to a 9/16 inch I.D. recrystallized alumina crucible, and a cylindrical tantalum weight of about 30 g. was placed on an alumina disc on top of the charge. After completely flushing the system with argon, sintering was carried out by increasing the temperature to 1450° C. in 35 minutes and holding at temperature for 10 minutes. The neutron output of the sintered source was $1.0 \times 10^5$ n/sec., 95% of the theoretical neutron yield or $1.0 \times 10^5$ n/g. Pu.

What is claimed is:

1. A method of producing neutron source material which comprises mixing plutonium dioxide and beryllium metal in particle size not substantially less than minus 200 mesh to uniformly distribute the former in the latter and sintering the mass under vacuum at a temperature below the melting point of the plutonium beryllium alloy formed.

2. The method defined in claim 1 wherein the mixture is degassed under vacuum at a temperature of substantially 400° C. before sintering.

3. The method defined in claim 1 wherein the mixture is compressed into pellets before sintering.

4. The method defined in claim 1 wherein the Be/Pu ratio in the mixture is substantially 15:1 and the sintering temperature is from 1400 to 1450° C.

5. The method defined in claim 1 wherein the sintering temperature is substantially 1250° C. and the Be/Pu ratio in the mixture is at least 30:1.

References Cited in the file of this patent

Nuclear Fuel Elements, edited by Hausner and Schumar, Reinhold Publishing Corp., New York, pages 138–143.

Footnote 48: Second International Conf. on Peaceful Uses of Atomic Energy, September 1958, page 1452.

"Plutonium Technology for Reactor Systems," Waldron et al.

Second International Conf. on Peaceful Uses of Atomic Energy, September 1958, vol. 14, pages 427–431, by Tate et al.